Patented Aug. 30, 1938

2,128,537

UNITED STATES PATENT OFFICE 2,128,537

DISAZO DYESTUFFS

José Stephen Petrus-Blumberger, Delft, Netherlands, assignor to General Aniline Works, Inc., New York, N. Y., a corporation of Delaware No Drawing. Application April 22, 1936, Serial No. 75,884. In Germany May 2, 1935

4 Claims. (Cl. 260—175)

The present invention relates to new azo dyestuffs, more particularly it relates to dyestuffs which may be represented by the general formula:

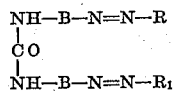

wherein B stands for a radical of the benzene series bearing the azo-group in meta-position to the NH group, such as a benzene nucleus which may bear substituents, e. g. methyl, a halogen atom, or a carboxylic acid-group.

R stands for the radical of 1-amino-5-naphthol-7-sulfonic acid or of 2-amino-8-naphthol-6-sulfonic acid and $R_1$ stands for a radical of 1-amino-5-naphthol-7-sulfonic acid, 2-amino-8-naphthol-6-sulfonic acid, or 2-amino-5-naphthol-7-sulfonic acid, the 2 coupling components being coupled to the hydroxy side.

My new dyestuffs are obtainable by coupling tetrazotized 3,3'-diaminodiphenyl urea or a homologue thereof first with 1-amino-5-naphthol-7-sulfonic acid or 2-amino-8-naphthol-6-sulfonic acid and then with one of the said components or 2-amino-5-naphthol-7-sulfonic acid.

The dyestuffs thus obtainable can be tetrazotized on the fiber and developed with the usual developers such as β-naphthol or toluylene diamine.

In this manner are obtained in general Bordeaux to brown shades of good fastness to washing and good dischargeability, both, with a neutral and with an alkaline discharge paste.

The invention is illustrated by the following examples, but it is not restricted thereto.

Examples 121 parts of m,m'-diaminodiphenyl urea are tetrazotized with 69 parts of sodium nitrite and 300 parts of concentrated hydrochloric acid and then the finished tetrazo solution is poured into a solution alkaline with sodium carbonate of 239 parts of 1-amino-5-naphthol-7-sulfonic acid.

The dyestuff, having in the free state the following formula:

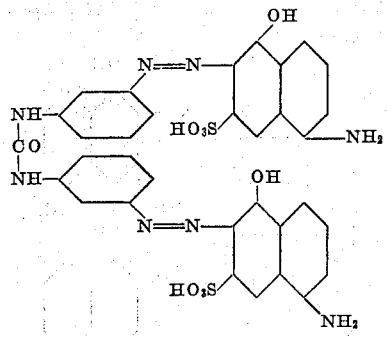

is filtered off in the cold, squeezed and dried. It yields on cotton Bordeaux shades, which, after tetrazotizing and developing with β-naphthol remain Bordeaux, with toluylene-diamine yield a reddish brown.

In an analogous manner have been prepared the dyestuffs of the following formula:

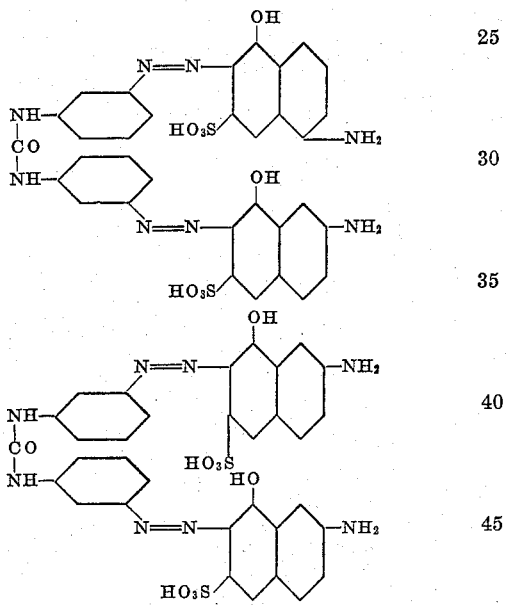

Both dyestuffs yield on cotton corinth shades, which, when tetrazotized and developed with toluylene-diamine, are turned to deep brown. When using β-naphthol as developer, the shade of the first dyestuff remains unchanged while that of the second dyestuff is turned to a bluish corinth.

I claim:

1. Azo dyestuffs of the general formula:

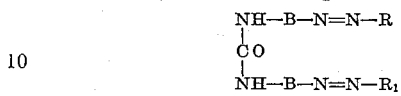

wherein B stands for a radical of the benzene series bearing the azo-group in meta-position to the NH group, R stands for the radical of an amino naphthol sulfonic acid of the group consisting of 1-amino-5-naphthol-7-sulfonic acid and of 2-amino-8-naphthol-6-sulfonic acid and $R_1$ stands for a radical of an amino naphthol sulfonic acid of the group consisting of 1-amino-5-naphthol-7-sulfonic acid, 2-amino-8-naphthol-6-sulfonic acid, and 2-amino-5-naphthol-7-sulfonic acid, the 2 coupling components being coupled to the hydroxy side, yielding, when tetrazotized on the fiber and developed in general Bordeaux to brown shades of good fastness to washing and good dischargeability.

2. The dyestuff having in its free state the following formula:

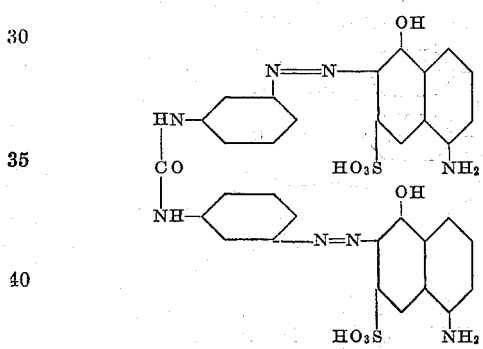

yielding on cotton Bordeaux shades, which, after tetrazotizing and developing with β-naphthol remain Bordeaux, with toluylene-diamine yield a reddish brown.

3. The dyestuff having in its free state the following formula:

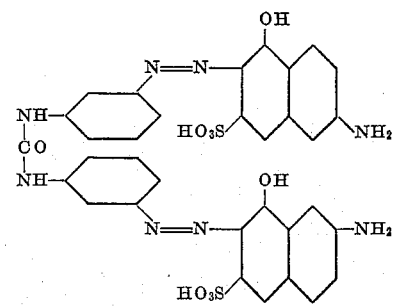

yielding on cotton corinth shades, which, after tetrazotizing and developing with toluylene-diamine are turned to deep brown.

4. The dyestuff having in its free state the following formula:

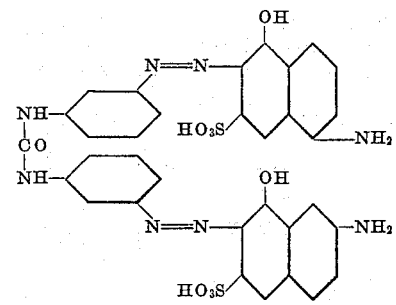

yielding on cotton corinth shades, which, after tetrazotizing and developing with toluylene-diamine are turned to deep brown.

JOSÉ STEPHEN PETRUS-BLUMBERGER.